Dec. 26, 1933.     R. P. LANSING     1,941,179
WEATHER SCREEN
Filed March 27, 1931
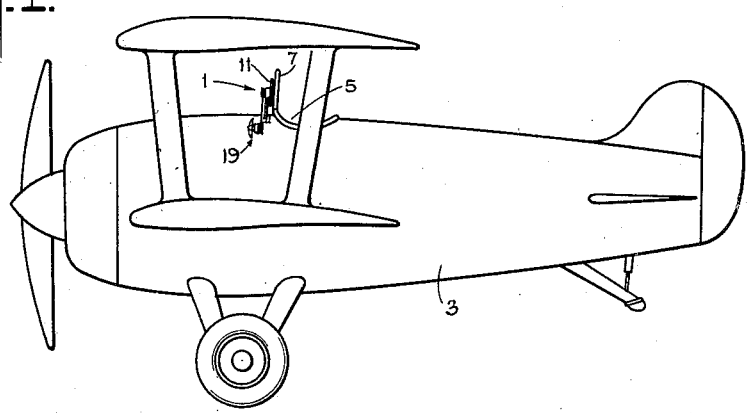
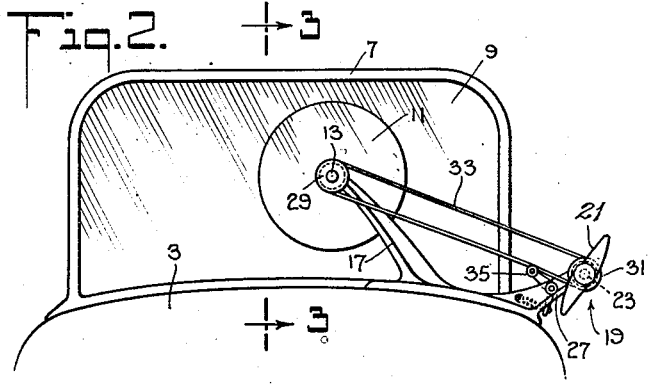
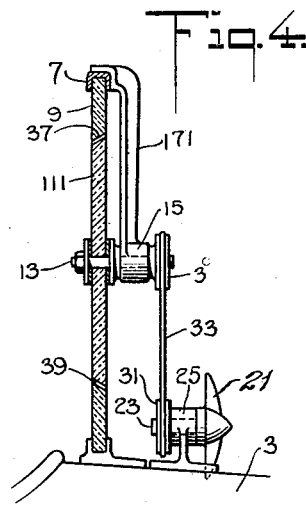
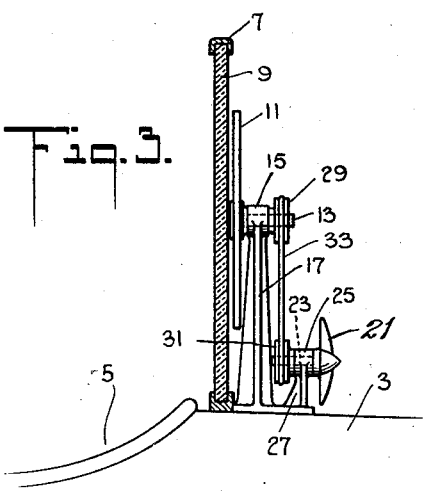
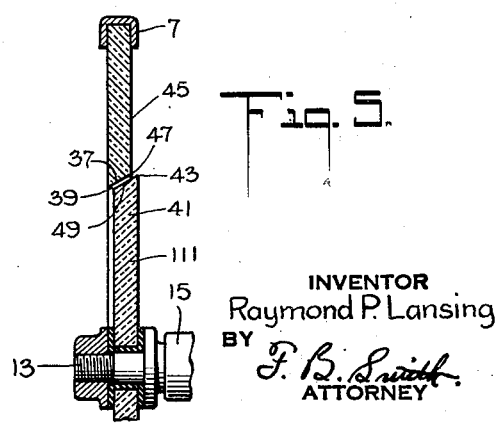
INVENTOR
Raymond P. Lansing
BY
F. B. Smith
ATTORNEY Patented Dec. 26, 1933

1,941,179

UNITED STATES PATENT OFFICE 1,941,179

WEATHER SCREEN

Raymond P. Lansing, Montclair, N. J., assignor to Bendix Research Corporation, East Orange, N. J., a corporation of Indiana Application March 27, 1931. Serial No. 525,836

4 Claims. (Cl. 20—40.5)

This invention relates to windshields, and more particularly to transparent weather screens for use on vehicles such as aircraft.

The general object is to prevent or avoid deposit, adhesion or accumulation on the transparent shield, before the eyes of the pilot, driver, or other vehicle occupant, of rain, snow or sleet, and so to maintain an adequate clear-vision area under adverse weather conditions; also, to reduce or minimize the obstruction to vision normally caused by spots, drops, sleet-particles, etc., which may adhere to the shield in the vision area.

These and other objects and advantages are attained by the provision of a revoluble, transparent shield element or disc, with means for rotating it at a suitable speed, so that, by centrifugal force, rain drops, snow, sleet or other substances driven against the disc are thrown off tangentially, and an unobstructed vision-area is preserved.

Another object is to drive the rotary shield element in a simple, efficient and economical manner; and this is accomplished, in preferred embodiments, and especially when the invention structure is employed in an aircraft, by mounting a propeller or "windmill" in the slip-stream of the craft, and in a convenient location as near the shield element as may be, with a belt or other suitable driving connection between the propeller and the disc.

While, as indicated above, the invention is applicable to various vehicles, where clear-vision windshielding is desirable, one preferred adaptation is to aircraft, including lighter-than-air vessels and especially airplanes, since these craft have an average air-speed ample to insure effective propulsion of the rotary shield-disc by an air-propeller or impeller located in the slipstream.

The rotary disc may be the sole or principal transparent shielding element; but in practical adaptations, as here shown, it is usually and preferably associated with or arranged as a part of a complete windshield structure, which may include a main, fixed, opaque or transparent shielding sheet or pane, of glass or other suitable material, usually of area greater than that of the rotary element, to afford ample vision area during clear weather; and the revolving disc may be located close in front of the main shield-pane, or at or in an aperture therein, as will appear.

The characteristics and advantages of the invention are further sufficiently explained in connection with the following detail description of the accompanying drawing, which illustrates representative embodiments. After considering these examples, skilled persons will understand that many variations may be made without departing from the principles disclosed; and I contemplate the employment of any structures that are properly within the scope of the appended claims.

Fig. 1 is a side elevation of an airplane (somewhat conventionally represented) provided with a windshield structure, embodying the invention in one form.

Fig. 2 is a front elevation, enlarged, non-essential parts of the airplane being omitted.

Fig. 3 is a section at 3—3, Fig. 2.

Fig. 4 is a similar section of a modification.

Fig. 5 is an enlarged detail, similar to Fig. 4, showing another slight modification, or variation in position of the rotary shielding element.

In the form shown in Figs. 1 to 3, the invention structure 1 (Fig. 1) is mounted on an airplane, including the fuselage 3 having a pilot's cockpit 5. A stationary shield (Figs. 2 and 3) including a frame 7 and a glass or other transparent or opaque sheet 9 is secured, in vertical or back-slanted position, at the forward edge of the cockpit, as usual.

A disc 11 of any suitable transparent material (glass being preferred in many cases) is revolubly supported, parallel and close to the front face of the stationary shield. While the disc may be supported partly or entirely in a bearing mounted in an aperture in the stationary shield-pane 9 (when that is of a suitable material, for example glass), as here shown the disc is clamped or otherwise secured on one end of a shaft 13, revolubly mounted in a bearing 15 (of ball, roller or other type) on an arm or bracket 17 which is secured in a convenient position on the fuselage, or a frame-element thereof; or the bearing may be supported upon or from the shield-frame 7, or otherwise.

A wind-motor or windmill 19 is located and supported, usually as close as possible to the rotary disc and in a convenient position in which it is exposed to air-draft adjacent the fuselage, or as described in this art, in the slip-stream. This air motor represents broadly any known or suitable disc-driving means or motor, including an electric motor, in any available location.

As particularly here shown, the wind-motor includes a propeller or impeller 21 on a shaft 23, mounted in any suitable bearing 25 on an arm or bracket 27, secured to the fuselage (or a frame-element thereof); or the bearing support may extend from the shield-frame 7, as shown at 171, Fig. 4.

The wind-motor is connected to drive the disc in any suitable way, as by belt gearing including pulleys 29 and 31 on disc-shaft 13 and motor-shaft 23 respectively, and a belt 33, with suitable belt-tensioning means (when necessary) such as a conventional jockey-pulley 35 riding the slack stretch of the belt. Belt drive is preferred in some cases for quietness, and smoothness of operation.

The propeller-blade-radius and pitch, with relation to the average air-speed of the craft, and the relative diameters of the driving and driven pulleys, are chosen to drive the rotary disc at a high speed, sufficient to produce the desired centrifugal action or effect, but substantially below that at which there is risk of rupture of the disc by centrifugal stress. Depending on various considerations, the disc may run at the same, or a higher or lower speed, in relation to the impeller.

In operation, while the craft is flying at average or higher speed, and also while on the ground, whenever the air-craft propeller is turning at fair speed, the air-blast acting on motor-propeller 21 turns it, and it rotates the shield disc 11, at a speed sufficient to exert powerful centrifugal effect on rain, snow, or sleet striking against its forward face, throwing such drops or particles radially or tangentially outward. Aside from the centrifugal action, the disc face is moving always at high speed in a direction substantially perpendicular to that in which the particles impinge upon it; there is therefore a minimum opportunity for particle-adhesion, since the contact-velocity is immensely greater and in a direction unfavorable to adhesion, as compared with a shield-surface in stationary relation to the vehicle.

When the rotary shield is associated with a stationary shield 9, as above described with reference to Figs. 1 to 3, the revolving element prevents (substantially or entirely) access of obscuring media to the circular area of the fixed sheet, close behind it; this area remains clean, and practically clear vision is afforded to the pilot (or other occupant of the craft, seated behind the shield) through a large part of the area of the rotary element, including practically all of it that is not somewhat obstructed by supporting or driving parts such as the shaft-connection to the disc, supporting bracket 17 and the belt; and the bracket, bearing and belt positions may be selected to present a large unobstructed area of the disc directly in front of the pilot's eyes. The unapertured fixed shield 9 provides complete wind-screening of the pilot (or other occupant).

Fig. 4 shows a modified structure or arrangement, in which the main, or stationary shield 9 has a circular aperture 37 located substantially in front of the vehicle-occupant who is to be shielded, and to whom forward-vision is to be afforded. The rotary shield, or shield-element, 111, is located near, at, or partially or completely within the fixed-shield aperture. That is, the rotation axis of the disc 111 (center-line of its shaft 13) is at the center of the aperture 37, and by repositioning the shaft-bearing 15, or other adjustment, the disc may evidently be located somewhat forward of the fixed shield 9, and in that case may be of diameter slightly larger than the aperture, to overlap the aperture margin (but without contact therewith); or the plane of the rotary disc may be slightly forward of that of the fixed shield 9, thus positioning the revolving shield partly within the main-shield aperture as just above mentioned. It is considered unnecessary to illustrate these minor variations.

Specifically, as shown in Fig. 4, the center-plane of rotation of disc 111 is practically in the center-plane of fixed shield 9, so that the disc is located actually within the aperture, and is of a diameter providing a small, but substantial circular clearance 39, sufficient to prevent contact. Or, as shown in enlarged detail in Fig. 5, the disc is so located or is of such thickness in relation to fixed sheet 9 that the forward face 41 and edge 43 of the rotary element are slightly in front of the similar face 45 and edge 47 of the stationary glass. As also shown in Figs. 4 and 5, the disc periphery 49 may be beveled at a cone-angle converging rearwardly. This, especially when the face 41 and edge 43 are slightly forward of the front face 45 of the field shield, facilitates tangential discharge of contacting particles in front of the main shield, whose principal function in bad weather is to protect the pilot (driver, or other vehicle occupant) from air-blast and air-borne particles. Clear or substantially clear vision is maintained through the revolving disc, as previously sufficiently explained, and the slight clearance-gap about the rotary element is insufficient to permit passage therethrough of any considerable amount of air, sleet, etc.

The main, or fixed shield 9 with which the rotary shield may be associated, represents broadly any equivalent normally stationary wind shielding and vision-affording element, such as a window pane in an aircraft of "closed" or "cabin" type (or other craft or vehicle to which the invention may be applicable).

The shield element such as 9 is described as "stationary" or "fixed", with reference to its location on a main structure such as an aircraft fuselage or the like; and, while normally stationary, it may of course be adjusted (tilted, etc.); and the belt or equivalent driving connection from the wind motor to the disc will accommodate a reasonable degree of tilting of the disc, such as may occur, if the disc is mounted on the main shield or its frame, as an incident to tilting (or adjustment) of the latter.

If desired, the wind motor and driving connections to the rotary shield may be located rearward of the plane of the rotary or fixed shield (with reference to the normal direction of motion of the aircraft, or other vehicle), thus protecting such driving connections, partly or entirely, from rain, snow, sleet, etc.

What is claimed is:

1. A weather screen, a fixed transparent windshield therefor having a conical opening with its smaller dimension toward the rear side of the windshield, a rotary correspondingly tapered disc in said opening, and means for rotating the disc.

2. A weather screen, a fixed transparent windshield therefor having a conical opening with its smaller dimension toward the rear side of the windshield, a rotary correspondingly tapered disc in said opening having its forward edge in advance of the front side of the windshield, and means for rotating the disc.

3. In a weather screen, a fixed transparent shield having a conical opening with its smaller diameter toward the rear of the shield, a rotary transparent disc having its peripheral portion tapered to correspond to the opening, means secured to the fixed shield for rotatably supporting the disc within the conical opening in the shield, and means for rotating said disc.

4. In a weather screen, a fixed transparent shield having a conical opening with its smaller diameter toward the rear of the shield, a rotary transparent disc having its peripheral portion tapered to correspond to the opening, means secured to the fixed shield for rotatably supporting the disc within the conical opening in the fixed shield, said rotary disc being arranged within the opening in a manner to have its forward face slightly in advance of the forward face of the fixed shield whereby moisture collecting on the disc will be thrown clear of the fixed shield, and means for rotating said disc.

RAYMOND P. LANSING.